March 29, 1927.
P. M. FREER
PISTON
Filed Sept. 17, 1923
1,622,579
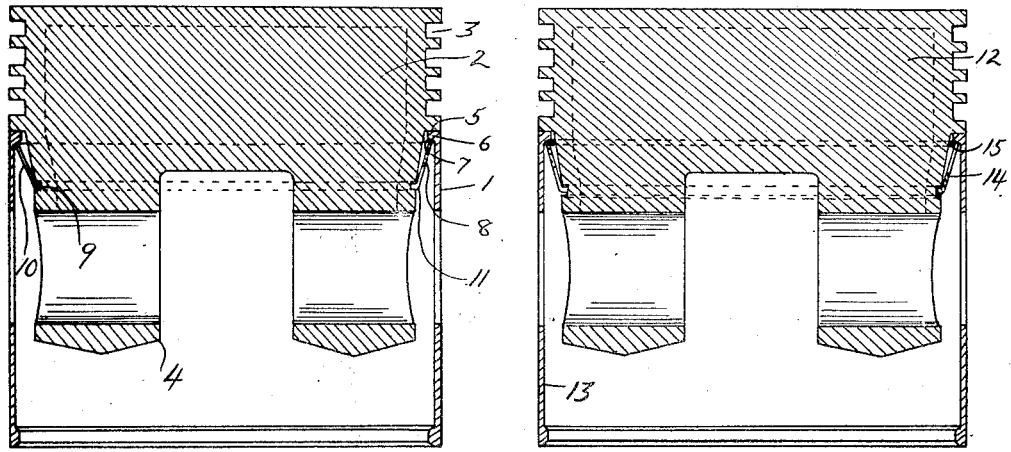
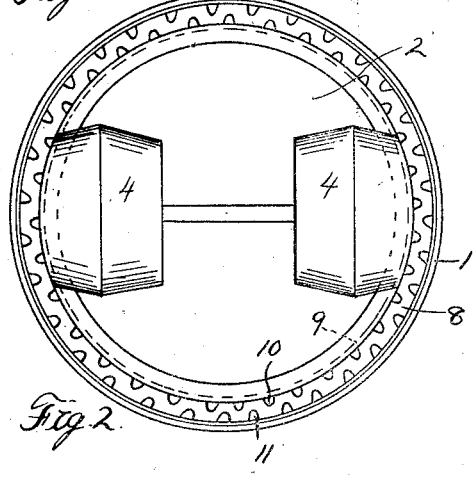
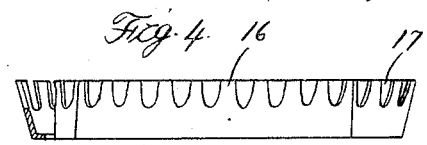
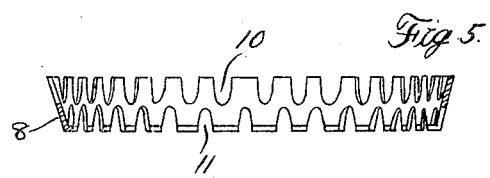
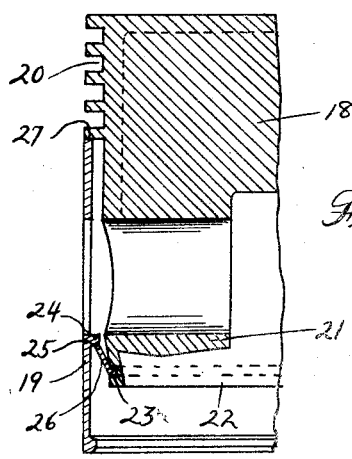
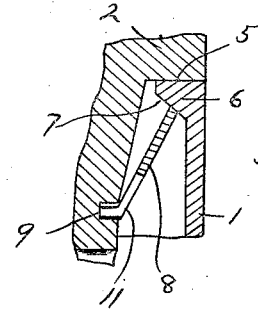
Inventor
Phelps M. Freer
Attorneys Patented Mar. 29, 1927.

1,622,579

UNITED STATES PATENT OFFICE.

PHELPS M. FREER, OF DETROIT, MICHIGAN.

PISTON.

Application filed September 17, 1923. Serial No. 663,236.

The invention relates to pistons designed particularly for use in internal combustion engines and has for its object the provision of a simple form of composite piston comprising a head and a skirt, and of a simple means for securing the head to the skirt.

Other objects of the invention reside in the novel features of construction and combinations and arrangements of parts as more fully hereinafter set forth.

In the drawings:

Figure 1 is a central section through a piston embodying my invention;

Figure 2 is a bottom plan view thereof;

Figure 3 is a view similar to Figure 1 and showing a modified construction of means for securing the head to the skirt;

Figure 4 is a sectional elevation of a further modified construction of means for securing the head to the skirt;

Figure 5 is a sectional elevation of the means shown in Figure 1 for securing the head to the skirt;

Figure 6 is an enlarged section of a portion of the piston shown in Figure 1;

Figure 7 is a view similar to Figure 1 and showing a modified construction of piston.

As shown in Figures 1, 2 and 6, the piston designed particularly for use in an internal combustion engine comprises the skirt 1 and the head 2 extending upwardly through the skirt and thereabove, the head being provided with the annular grooves 3 for receiving the piston rings and having depending bosses 4 for connecting the piston to the connecting rod through a wrist pin. The head is preferably formed of a relatively light metal such as aluminum, while the skirt is formed of a relatively hard metal such as iron to afford a good wearing surface for the piston upon the cylinder walls. The skirt is made very thin so that it will have a minimum weight.

For attachably securing the head to the skirt, the head is provided with the annular lateral shoulder 5 which is adapted to abut the upper end of the inwardly extending annular flange 6 of the skirt 1. This flange is provided with the inwardly and upwardly tapering or conical bearing face 7 engageable with the upper edge of the resilient securing ring 8 and the head is provided with the annular groove 9 engageable with the lower edge of the securing ring, this ring being under compression when the head is assembled to the skirt and holding the upper end of the flange 6 of the skirt firmly against the lateral shoulder 5 of the head. Furthermore, by reason of providing, as shown particularly in Figure 6, an inwardly and upwardly tapering or conical bearing face upon the flange of the skirt and engageable with the upper edge of the securing ring and by placing the latter under compression, the skirt is automatically centered relative to the head.

The securing ring 8, as shown particularly in Figure 5, is provided with the annular upper and lower series of open ended notches 10 and 11 respectively which alternate about the periphery of the ring and which provide for the necessary flexibility of the ring to assemble the same with the head and skirt.

The head 12 and skirt 13 of the piston shown in Figure 3 is formed in the same manner as the head and skirt of the piston shown in Figure 2, but the means for securing the head to the skirt is different. This means comprises the resilient ring 15 also having a transverse split therein and engageable with the inner side of the ring 14 near its upper edge to yieldably hold the same radially outward, the splits in the two rings being preferably opposite each other. The lower face of the annular groove in the piston is preferably inclined upwardly and outwardly to more effectively retain the lower edge of the securing ring in engagement. This securing means functions in the same manner as that shown in Figures 1 and 2, but with this securing means it is not necessary to provide the annular series of open ended notches in the lower edge of the ring 14, although it is preferable that the open-ended notches be provided in the upper edge of this ring.

With the construction of piston shown in Figure 3, a sectional tempered ring 16 such as shown in Figure 4 may be used instead of the ring 14 or the ring 8. The ring 16 has a number of transverse splits therethrough and is provided with the annular series of upper open ended notches 17 to secure the essential resiliency for properly securing the head to the skirt and centering the skirt upon the head. A suitable resilient means such as the ring 15 is used for forcing the upper edge of the sectional ring radially outward into wedging engagement with the skirt.

In the modified construction of piston shown in Figure 7, 18 is the head preferably formed of aluminum and 19 the skirt preferably formed of iron, the head having the series of annular grooves 20 for receiving the piston rings and having the depending bosses 21 for securing the piston to the connecting rod. The head in this instance is provided with the annular flange 22 extending below the bosses 21 and provided in its outer face with the annular groove 23. The skirt 19 is provided with the annular inwardly extending flange 24 located above the normal position of the annular groove 23 and provided with the lower upwardly and inwardly tapering or conical face 25. A suitable securing means 26, which as shown, is a ring similar to that shown in Figure 1, is provided for securing the head to the skirt and holding the upper end of the skirt firmly against the lateral shoulder 27 of the skirt. If desired, the securing means shown in Figures 3 or 4 may also be used.

What I claim as my invention is:

1. In a piston, the combination with a head and a skirt sleeved over a portion of the same, of a common means for securing said head to said skirt and for centering said skirt upon said head.

2. In a piston, the combination with a head having an annular groove and a skirt surrounding a portion of said head, said skirt having an inwardly extending flange, of a ring engaging in said annular groove and resiliently engaging said flange.

3. In a piston, the combination with a head provided with an annular groove and a skirt surrounding a portion of said head, said skirt having an inwardly extending flange provided with a lower upwardly and inwardly inclined bearing face, of a ring having a lower edge engaging in said annular groove and an upper edge resiliently engaging said bearing face.

4. In a piston, the combination with a head and a skirt surrounding a portion thereof, of means for securing said head to said skirt including a transversely split ring having a lower edge engageable with said head and an upper edge engageable with said skirt, and means for radially forcing the upper edge of said ring outwardly.

5. In a piston, the combination with a head and a skirt surrounding a portion of the same, said skirt being provided with an inwardly extending flange having a lower upwardly and inwardly inclined bearing face and said head being provided with an annular groove located below said flange, of a transversely split ring having its lower edge engageable in said annular groove and its upper edge engageable with said bearing face, and a second transversely split ring engageable with the inner face of said first-mentioned ring near its upper edge for radially forcing the same outwardly.

6. In a piston, the combination with a head and skirt sleeved over a portion of said head, said sleeve and head having shoulders respectively, and a member engageable with said shoulders by a portion therefor normally under compression, said portion affording resilience of movement in the direction of the said portion lying between said shoulders.

7. In a piston. the combination with a head and skirt sleeved over a portion of said head, said sleeve and head having shoulders respectively, and a frusto-conical ring having its opposite peripheries engaging with said shoulders respectively.

8. In a piston, the combination with a head and skirt sleeved over a portion of said head, said sleeve and head having shoulders respectively, and a member engageable with said shoulders, said member being relatively thin in its cross sectional width as compared with its length lying between said shoulders.

9. In a piston, the combination with a head and skirt sleeved over a portion of the head and a member engageable with portions of the head and skirt for clamping the head and skirt together, said member being relatively thin in its cross sectional width as compared with its cross sectional length lying between the said engaged portions of the head and skirt.

10. In a piston, the combination with a head and a skirt sleeved over a portion thereof, said head having a shoulder and said skirt having a shoulder, of a ring having a lower edge abutting the shoulder upon said head and an upper edge abutting the shoulder upon said skirt, the portion of said ring between the said shoulders being resilient in the direction of the length of the portion lying between said shoulders.

11. In a piston, the combination with a head and a skirt surrounding a portion thereof, of a ring mounted on said head and having a wedging engagement with said skirt, the portion of said ring between the head and skirt being resilient in the direction of the portion lying between the head and skirt, and normally under compression.

12. In a piston, the combination with a head member and a skirt member sleeved over a portion of the head member, of an element having one end relatively fixed to one of said members, and having the other end radially movable of the piston into wedging engagement with the other of said members, said element engageable with portions of the head and skirt members for clamping the head and skirt together.

13. In a piston, the combination with a head and a skirt surrounding a portion of said head, of an element extending between said head and skirt, said element having a portion anchored upon said head and provided with another portion having a wedging engagement with said skirt, the engagement between said element and skirt being such that said element frictionally resists movement of said skirt relative to said head.

14. In a piston, a head, a skirt sleeved upon a portion of said head and having a different coefficient of expansion and a member clamping said head and skirt together and having a yieldable portion extending between said head and skirt to allow for difference in expansion of said head and skirt.

In testimony whereof I affix my signature.

PHELPS M. FREER.